United States Patent
Gobara (10) Patent No.: US 7,486,232 B2
(45) Date of Patent: Feb. 3, 2009

(54) POSITIONING APPARATUS, POSITIONING METHOD, POSITIONING PROGRAM, AND COMPUTER-READABLE RECORDING MEDIUM FOR RECORDING POSITIONING PROGRAM

(75) Inventor: Naoki Gobara, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 272 days.

(21) Appl. No.: 11/127,219

(22) Filed: May 12, 2005

(65) Prior Publication Data

US 2005/0253755 A1    Nov. 17, 2005

(30) Foreign Application Priority Data

May 13, 2004    (JP)    ............... 2004-143970

(51) Int. Cl.
*G01S 1/00*    (2006.01)
(52) U.S. Cl. ................................. 342/357.15
(58) Field of Classification Search ................................
342/357.01–357.17
See application file for complete search history.

(56) References Cited

U.S. PATENT DOCUMENTS

| 6,313,786 B1 | 11/2001 | Sheynblat et al. | |
| 6,556,832 B1* | 4/2003 | Soliman | .................. 455/456.5 |
| 2005/0046614 A1* | 3/2005 | Akano | .................. 342/357.02 |
| 2005/0195107 A1* | 9/2005 | Wakamatsu | ............ 342/357.15 |

FOREIGN PATENT DOCUMENTS

| JP | 63-006414 | 1/1988 |
| JP | 05099680 A | 4/1993 |
| JP | 07-134171 | 5/1995 |
| JP | H10-253739 A | 9/1998 |
| JP | 2001-074826 | 3/2001 |
| JP | 2003-514215 A | 4/2003 |
| JP | 2003-215228 | 7/2003 |
| KR | 1999-0085354 A | 12/1999 |

\* cited by examiner

*Primary Examiner*—Thomas H. Tarcza
*Assistant Examiner*—Nga X Nguyen
(74) *Attorney, Agent, or Firm*—Global IP Counselors, LLP (57) ABSTRACT

A positioning apparatus 100 includes: a satellite selection indicator information generating device 121 that generates satellite selection indicator information based on satellite location information 131 of SPS to select SPS to be used for positioning; a positioning device 111 that acquires positioning information 135 using the SPS selected based on the satellite selection indicator information; and an outputting device 102 that outputs the positioning information. The positioning apparatus includes: a reception environment indicator information generating device 123 that generates reception environment indicator information 134 for the SPS to compare to the satellite selection indicator information with respect to positioning precision, and calculated based on reception environment information contained in electric waves from the SPS; and a positioning information evaluation device 120 that determines whether the positioning information is to be output to the outputting device or not.

11 Claims, 9 Drawing Sheets

DOP VALUE VARIABLE RATIO TABLE

| NUMBER OF INDOOR MODE SPS SATELLITES / NUMBER OF SPS SATELLITES LOCATED × 100(%) | VARIABLE RATIO FOR DOP THRESHOLD VALUES (%) |
|---|---|
| EQUAL TO OR MORE THAN 0% AND LESS THAN 20% | 100 |
| EQUAL TO OR MORE THAN 20% AND LESS THAN 40% | 90 |
| EQUAL TO OR MORE THAN 40% AND LESS THAN 60% | 80 |
| EQUAL TO OR MORE THAN 60% AND LESS THAN 80% | 70 |
| EQUAL TO OR MORE THAN 80% AND LESS THAN 100% | 60 |
| 100% | 50 |

| SPS SATELLITE NO. | POSITIONING MODE |
|---|---|
| SPS SATELLITE 10a | OUTDOOR MODE |
| SPS SATELLITE 10b | OUTDOOR MODE |
| SPS SATELLITE 10c | OUTDOOR MODE |
| SPS SATELLITE 10d | OUTDOOR MODE |
| SPS SATELLITE 10e | OUTDOOR MODE |
| SPS SATELLITE 10f | OUTDOOR MODE |
| SPS SATELLITE 10g | OUTDOOR MODE |
| SPS SATELLITE 10h | OUTDOOR MODE |

FIG. 7A

| SPS SATELLITE NO. | POSITIONING MODE |
|---|---|
| SPS SATELLITE 10a | OUTDOOR MODE |
| SPS SATELLITE 10b | INDOOR MODE |
| SPS SATELLITE 10c | OUTDOOR MODE |
| SPS SATELLITE 10d | INDOOR MODE |
| SPS SATELLITE 10e | INDOOR MODE |
| SPS SATELLITE 10f | OUTDOOR MODE |
| SPS SATELLITE 10g | OUTDOOR MODE |
| SPS SATELLITE 10h | - |

V1>V2
DOP1<DOP2

POSITIONING APPARATUS, POSITIONING METHOD, POSITIONING PROGRAM, AND COMPUTER-READABLE RECORDING MEDIUM FOR RECORDING POSITIONING PROGRAM

BACKGROUND OF THE INVENTION

1. Field of the Invention

The present invention generally relates to a positioning apparatus. More specifically, the present invention relates to a positioning apparatus, a positioning method, a positioning program, and a computer-readable recording medium for recording a positioning program.

2. Background Information

Conventionally, a SPS (Satellite Positioning System) apparatus has been used as a positioning system for positioning using manmade satellites. The SPS apparatus is constructed so as to determine its position by receiving signals from four satellites, for example. Specifically, the SPS apparatus performs positioning by selecting four SPS satellites from a large number of satellites located in the sky and receiving the signals therefrom. However, when the four SPS satellites selected by the SPS apparatus are close to one another, sometimes positioning precision deteriorates due to influence of signal noise or the like. Accordingly, in order to prevent the SPS apparatus from selecting such SPS satellites close to one another, DOP (Dilution Of Precision) values are used as shown in Japanese Patent Application Publication Hei-5-99680, especially FIG. 5 thereof. Japanese Patent Application Publication Hei-5-99680 is hereby incorporated by reference.

Figure 9A:
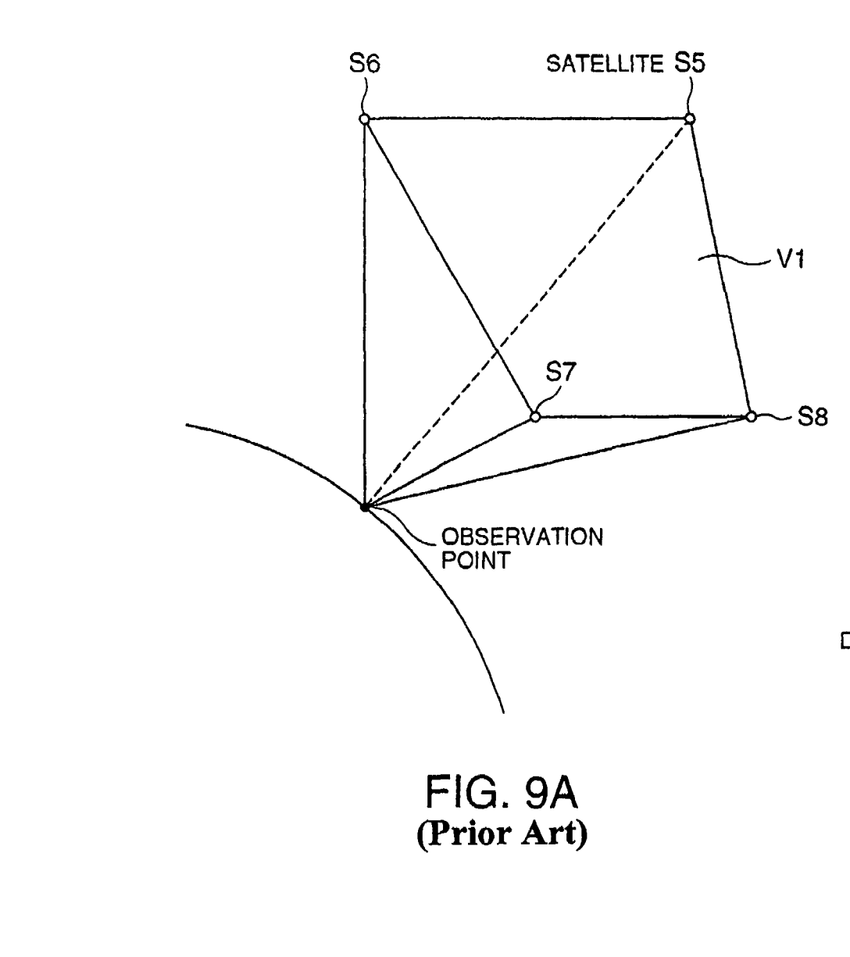
FIG. 9 is a view of a schematic explanatory view of DOP values.
Figure 9B:
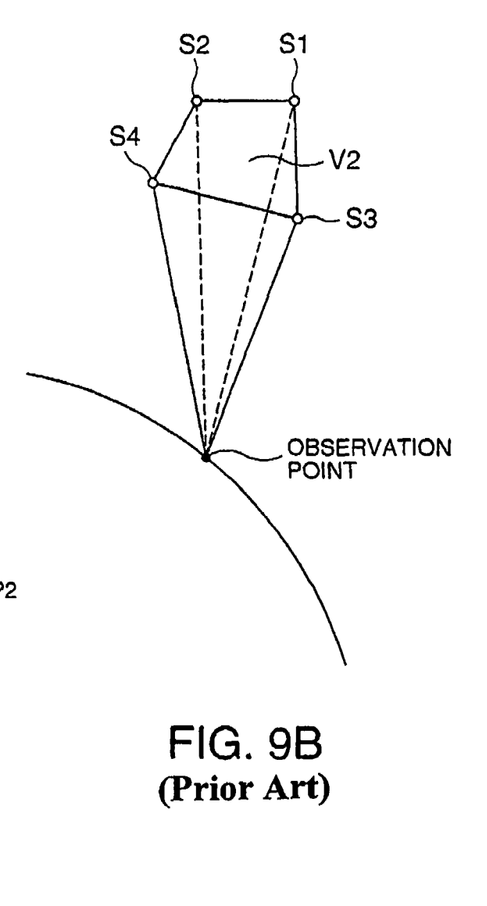

FIGS. 9A and 9B of the instant disclosure is a schematic explanatory view of the DOP values. In other words, FIG. 9A is a schematic explanatory view showing an example of a small DOP value, and FIG. 9B is a schematic explanatory view showing an example of a large DOP value. As shown in FIG. 9B, when the SPS apparatus selects SPS satellites S1 to S4 close to one another, the volume of a quadrangular pyramid formed by the four SPS satellites S1 to S4 becomes smaller and the DOP value becomes larger.

On the other hand, as shown in FIG. 9A, when the SPS apparatus selects SPS satellites S5 to S8 widely spaced from one another, the volume of a quadrangular pyramid formed by the four SPS satellites S5 to S8 becomes larger and the DOP value becomes smaller. Therefore, the SPS apparatus can improve the positioning precision by selecting SPS satellites S5 etc. that make the DOP value smaller.

However, even when the SPS apparatus selects SPS satellites to make the DOP value smaller, in cases of an environment having poor reception conditions for electric waves received from the selected SPS satellites, the positioning precision becomes lower, even though the DOP value is small. When the positioning precision worsens, the reliability of the DOP value deteriorating becomes a problem.

In view of the above, it will be apparent to those skilled in the art from this disclosure that there exists a need for an improved positioning apparatus, a positioning method, a positioning program, and a computer-readable recording medium for recording a positioning program. This invention addresses this need in the art as well as other needs, which will become apparent to those skilled in the art from this disclosure.

SUMMARY OF THE INVENTION

Therefore, it is an object of the present invention to provide a positioning apparatus, a positioning method, a positioning program, and a computer-readable recording medium for recording a positioning program that does not allow the positioning function evaluation reliability of satellite selection indicator information, such as DOP values, of SPS to deteriorate.

According to a first aspect of the present invention, the aforementioned object is realized by a positioning apparatus. The positioning apparatus includes a satellite selection indicator information generating device, a positioning device, and an outputting device. The satellite selection indicator information generating device generates satellite selection indicator information based on satellite location information of SPS located in the sky to select a plurality of the SPS used for positioning. The positioning device acquires positioning information using the plurality of SPS selected based on the satellite selection indicator information. The outputting device outputs the positioning information. The positioning apparatus is characterized a reception environment indicator information generating device. The reception environment indicator information generating device generates reception environment indicator information of the SPS that can be balanced against the satellite selection indicator information with respect to positioning precision. The positioning precision is calculated based on reception environment information contained in electric waves from the SPS. The positioning apparatus is also characterized by a positioning information evaluation device that determines whether the positioning information is to be output to the outputting device or not based on the satellite selection indicator information and the reception environment indicator information.

According to the constitution of the apparatus of the first aspect of the present invention, the satellite selection indicator information generating device generates DOP values, for example, as satellite selection indicator information based on the satellite location information of SPS located in the sky. The DOP value expresses the size of the volume of a quadrangular pyramid formed by four of the SPS. Further, the larger the volume, the smaller the numeric value becomes. Regarding this numeric value, when the number of target SPS is five or more, for example, plural DOP values are obtained according to combinations of the SPS. For example, there are plural DOP values such as "10, 9, 8."

In the case of the DOP value, as shown in FIGS. 9A and 9B, the larger the volume, i.e., the smaller the numeric value, the more the positioning precision is improved. Thus, when the satellite selection indicator information is DOP, the satellite selection indicator information generating device generates the smallest DOP value, for example, "8" as the satellite selection indicator passing value.

The positioning device acquires latitude, longitude, and altitude information as the positioning information, using in this example the plural SPS corresponding to the DOP value "8" which is the satellite selection indicator passing value.

On the other hand, the reception environment indicator information generating device generates reception environment indicator information which can be balanced against the satellite selection indicator information with respect to positioning precision, calculated based on reception environment information contained in electric waves from the SPS, for example, information on degree of signal intensity of electric waves from the SPS. In other words, the reception environment indicator information is information relating to the degree of signal intensity of electric waves from the SPS, for example, and displayed as values "from 10 to 5", for example, as threshold values that can be balanced against the DOP values.

In other words, the reception environment indicator information is information on the quality of the reception environment for electric waves from the SPS for which satellite selection indicator information has been calculated. Reception environment indicator information is expressed in numeric values, for example.

The reception environment indicator information can be balanced against the satellite selection indicator information with respect to positioning precision. In other words, the numeric values "from 10 to 5" are values that can be balanced against the DOP values by being set for example so that the smaller the value, the worse the environment of the reception condition is.

By the way, even when from the above plural DOP values "10, 9, 8", the four SPS with the smallest DOP value "8" are selected, and the positioning device performs positioning or the like accordingly, in the case where the electric waves from the SPS are received indoors or the like, the reception environment is bad, and thereby, even if the DOP value is small, the positioning precision is poor.

Accordingly, the positioning information evaluation device balances for example the DOP value "8," the satellite selection indicator value, against the numeric value "6," the reception environment indicator value, and determines whether the positioning information is to be output to the outputting device or not.

Thus, according to the constitution of the present invention, whether to output the positioning information by the positioning device is determined by balancing the satellite selection indicator information such as DOP values against the reception environment indicator information given in numeric values, with respect to positioning precision.

Accordingly, unlike a conventional apparatus, there is never a case that when the positioning precision becomes worse because the reception environment for electric waves from the SPS selected based on the satellite selection indicator information such as DOP values, the positioning information is output to the outputting device without change.

Therefore, the positioning precision of the positioning apparatus can be prevented from becoming worse, and the positioning function evaluation reliability of the satellite selection indicator information can be prevented from deteriorating.

An apparatus according to a second aspect of the present invention is the apparatus of the first aspect, wherein the SPS for which the reception environment indicator information generating device generates reception environment indicator passing values are the plurality of SPS used for the positioning.

According to the constitution of the apparatus of the second aspect of the present invention, since the reception environment indicator information generating device generates the reception environment indicator information on the plural SPS used for the positioning, the reception environment condition of electric waves from the SPS selected based on the satellite selection indicator information such as DOP values can be grasped more accurately.

Accordingly, since output of the positioning information can be performed more precisely, the positioning function evaluation reliability of the satellite selection indicator information can be prevented from deteriorating and be more stable.

An apparatus according to a third aspect of the present invention is the apparatus of the first or second aspect, wherein the reception environment indicator information is reception environment threshold value information, and the satellite selection indicator information is DOP value information representing a location status of the SPS.

According to the constitution of the apparatus of the third aspect of the present invention, the reception environment indicator information is reception environment threshold value information. For example, the reception environment indicator information is threshold values "from 10 to 5." Further, the lower the threshold value, the worse the reception environment becomes.

On the other hand, the DOP value used as the satellite selection indicator value is not affected by the reception environment. When the locations of the SPS are preferable, the DOP value becomes lower, and if the locations are not desirable, the DOP value becomes higher.

Further, in comparison between the cases of "10" and "7," for example, the positioning precision sometimes becomes better in the case of "10," the higher DOP value, than the case of "7," the lower DOP value, because of reception environment difference. The deterioration in positioning precision cannot be determined by the DOP values only.

However, in the present invention, the reception environment indicator information is expressed in threshold values "from 10 to 5," for example, as information which can be balanced against the DOP values with respect to the positioning precision.

Accordingly, the degree of deterioration in reception environment can be expressed by the threshold values "from 10 to 5." Therefore, by comparing the threshold values with DOP values, the influence of the reception environment, which deteriorates the positioning function evaluation reliability of the DOP values, can be determined in a simple and precise manner.

An apparatus according to a fourth aspect of the present invention is the apparatus of any of the first three aspects, wherein the reception environment indicator information is in an outdoor mode in which signal intensity from the SPS is strong or in an indoor mode in which signal intensity from the SPS is weak, each of the SPS are in either the outdoor mode or the indoor mode, and the reception environment indicator information is information based on the ratio of the SPS in the outdoor mode or the indoor mode.

According to the constitution of apparatus of the fourth aspect of the present invention, since the reception environment information of each SPS is expressed as "outdoor mode" or "indoor mode", representing signal intensity, the signal intensity can be grasped easily.

Further, the reception environment indicator information is formed based on the ratio of all the SPS in the outdoor mode and all those in the indoor mode. Accordingly, the reception environment indicator information of the SPS selected according to the satellite selection indicator information can be generated in a simple and precise manner.

A positioning method according to a fifth aspect of the present invention includes: a satellite selection indicator information generating step at which a satellite selection indicator information generating device of a positioning apparatus generates satellite selection indicator information based on satellite location information of SPS located in the sky, to select a plurality of the SPS used for positioning; a positioning step at which a positioning device of the positioning apparatus acquires positioning information using the plurality of SPS selected based on the satellite selection indicator information; and an outputting step at which an outputting device of the positioning apparatus outputs the positioning information. The positioning method is characterized by: a reception environment indicator information generating step at which a reception environment indicator information generating device of the positioning apparatus generates reception environment indicator information of the SPS which can be balanced against the satellite selection indicator information with respect to positioning precision, which is calculated based on reception environment information contained in electric waves from the SPS; and a positioning information evaluation step at which a positioning information evaluation device of the positioning apparatus determines whether the positioning information is to be output to the outputting device or not based on the satellite selection indicator information and the reception environment indicator information.

According to the constitution of the method of the fifth aspect of the present invention, similar to the constitution of apparatus of the first aspect, whether to output the positioning information generated by the positioning device is determined by balancing the satellite selection indicator information such as DOP values against the reception environment indicator information, given in numeric values, with respect to positioning precision. Accordingly, unlike a conventional method, there is never a case that when the positioning precision worsens because of the reception environment for electric waves from the SPS selected based on the satellite selection indicator information such as DOP values, the positioning information is output to the outputting device without a change. Therefore, the positioning precision can be prevented from becoming worse, and the positioning function evaluation reliability of the satellite selection indicator information can be prevented from deteriorating.

The aforementioned object of the present invention is realized according to a sixth aspect of the present invention by a positioning program. The positioning program allows a computer to execute: a satellite selection indicator information generating step at which a satellite selection indicator information generating device of a positioning apparatus generates satellite selection indicator information based on satellite location information of SPS located in the sky to select a plurality of the SPS used for positioning; a positioning step at which a positioning device of the positioning apparatus acquires positioning information using the plurality of SPS selected based on the satellite selection indicator information; and an outputting step at which an outputting device of the positioning apparatus outputs the positioning information. The positioning method is characterized by: a reception environment indicator information generating step at which a reception environment indicator information generating device of the positioning apparatus generates reception environment indicator information of the SPS which can be balanced against the satellite selection indicator information with respect to positioning precision, which is calculated based on reception environment information contained in electric waves from the SPS; and a positioning information evaluation step at which a positioning information evaluation device of the positioning apparatus determines whether the positioning information is to be output to the outputting device or not based on the satellite selection indicator information and the reception environment indicator information.

According to the program of sixth aspect of the present invention, similar to the apparatus of the first aspect of the present invention, the positioning function evaluation reliability of the satellite selection indicator information can be prevented from deteriorating.

The aforementioned object is realized according to a seventh aspect of the present invention by a positioning program. The positioning program allows a computer-readable recording medium to record a positioning program to allow a computer to execute the following: a satellite selection indicator information generating step at which a satellite selection indicator information generating device of a positioning apparatus generates satellite selection indicator information based on satellite location information of SPS located in the sky to select a plurality of SPS to be used for positioning; a positioning step at which a positioning device of the positioning apparatus acquires positioning information using the plurality of SPS selected based on the satellite selection indicator information; and an outputting step at which an outputting device of the positioning apparatus outputs the positioning information. The positioning program is characterized by: a reception environment indicator information generating step at which a reception environment indicator information generating device of the positioning apparatus generates reception environment indicator information of the SPS which can be balanced against the satellite selection indicator information with respect to positioning precision, which is calculated based on reception environment information contained in electric waves from the SPS; and a positioning information evaluation step at which a positioning information evaluation device of the positioning apparatus determines whether the positioning information is to be output to the outputting device or not based on the satellite selection indicator information and the reception environment indicator information.

According to the program of the seventh aspect of the present invention, similar to the apparatus of the first aspect, the positioning function evaluation reliability of the satellite selection indicator information never deteriorates.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Hereinafter, a preferred embodiment of the invention will be described in detail by referring to accompanying drawings, etc.

Since the embodiment as described below is a preferred specific example of the invention, technically preferred various limitations are imposed thereon; however, the scope of the invention is not limited to the modes in the explanations below unless there is a clause that specifically limits the invention.

Figure 1:
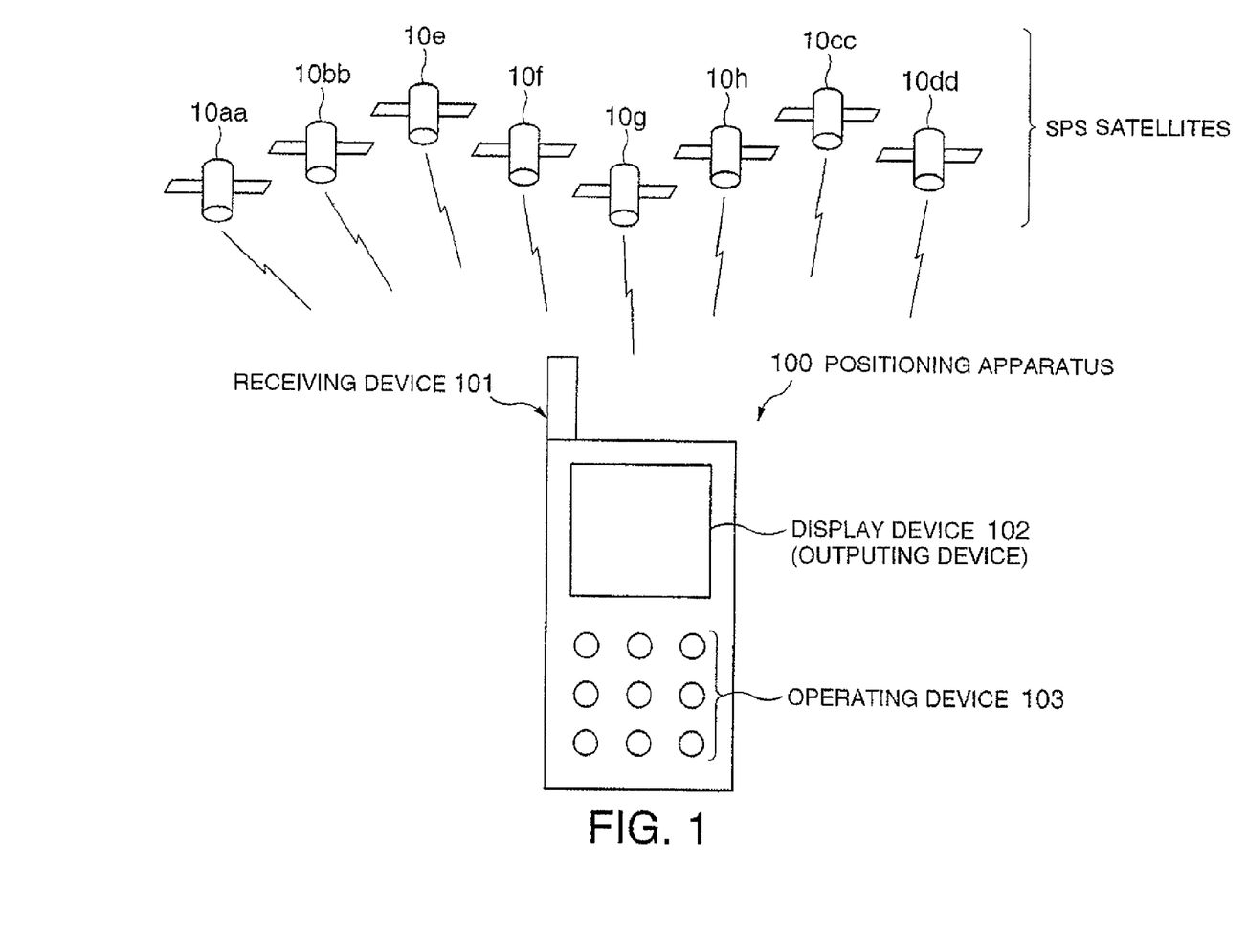
FIG. 1 is a view of a schematic diagram showing a positioning apparatus according to a first preferred embodiment of the present invention.

FIG. 1 is a view of a schematic diagram showing a positioning apparatus 100 according to a first preferred embodiment of the present invention. The positioning apparatus 100 shown in FIG. 1 is constructed to determine its own position with regard e.g. to latitude, longitude, and altitude, by SPS for example.

Accordingly, the positioning apparatus 100 has a receiving device 101 including an antenna or the like for receiving electric waves transmitted from SPS located in the sky, such as SPS satellites 10a . . . .

In a concrete example, the positioning apparatus 100 locates eight SPS satellites 10a to 10h, selects four of them, 10aa, 10bb, 10cc, and 10dd, for positioning as described below, and performs positioning.

Further, the positioning apparatus 100 has a display device 102 as a display, for example, to output and to display positioning information. Accordingly, the display device 102 is an example of an outputting or output device. A user of the positioning apparatus 100 can confirm the positioning result by viewing the positioning information displayed on the display device 102. The output device includes not only the display device 102 of the present embodiment, but also a construction to transmit positioning results to an external server or the like using a communication device (not shown). Further, the positioning apparatus 100 has an operating device 103 for the user to input information or the like including a numeric keypad or the like, for example.

Main Hardware Configuration of Positioning Apparatus 100

Figure 2:
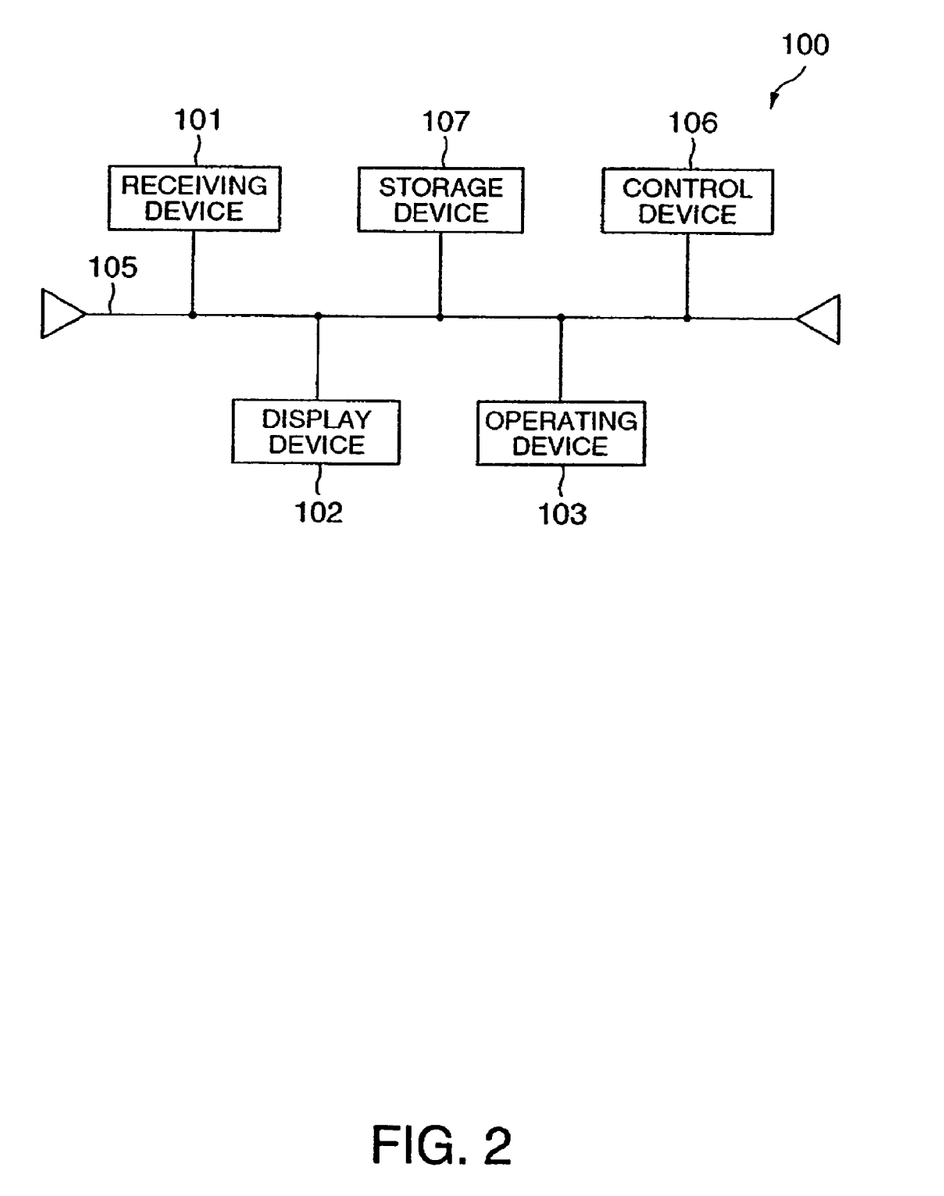
FIG. 2 is a view of a schematic diagram showing a configuration of main hardware parts in the positioning apparatus in FIG. 1.

FIG. 2 is a view of a schematic diagram showing a main hardware configuration of the positioning apparatus 100 shown of FIG. 1. As shown in FIG. 2, the positioning apparatus 100 has a computer. In other words, the computer includes a bus 105. Further, a control device 106 such as a CPU (Central Processing Unit), for example, is connected to the bus 105. Moreover, a storage device 107 including a RAM (Random Access Memory) or ROM (Read Only Memory) is also connected to the bus 105. Furthermore, the receiving device 101, the display device 102, and the operating device 103 shown in FIG. 1 are also connected to the bus 105.

In other words, the bus 105 is an internal bus having a function of connecting all devices and address and data paths. The control device 106 performs processing of predetermined programs and controls the storage device 107 connected to the bus 105 or the like. The storage device 107 stores various kinds of programs, various kinds of information, etc.

Regarding Main Software Configuration of Positioning Apparatus 100

Figure 3:
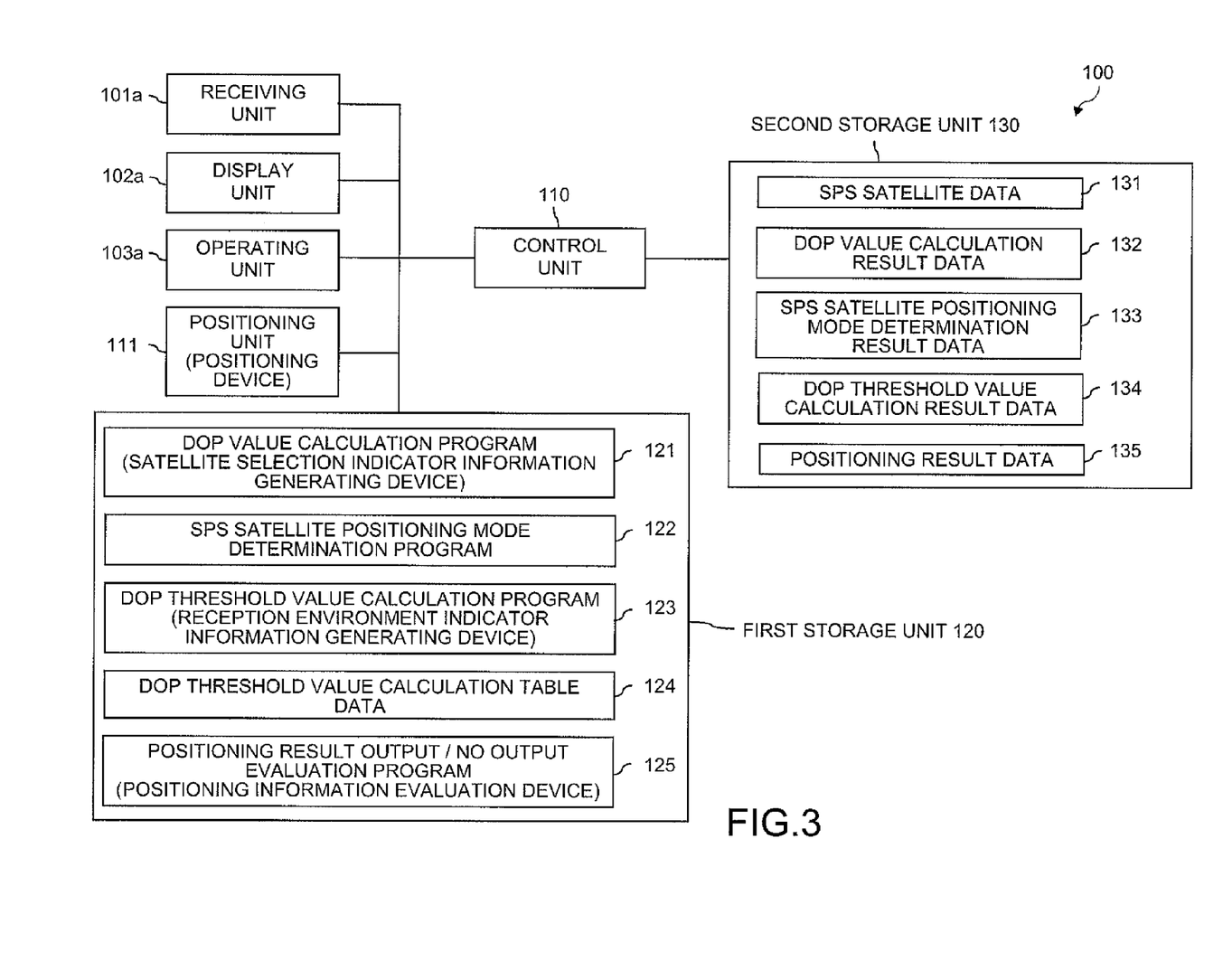
FIG. 3 is a view of a schematic diagram showing the configuration of the main software in the positioning apparatus in FIG. 1.

FIG. 3 is a view of a schematic diagram showing a main software configuration of the positioning apparatus 100 of FIG. 1. As shown in FIG. 3, the positioning apparatus 100 has a control unit 110 to control the entire positioning apparatus 100. Further, the positioning apparatus 100 has a receiving unit 101a, a display unit 102a, and an operating unit 103a to manage the receiving device 101, the display device 102, and the operating device 103 of FIG. 2, which are connected to the control unit 110. Accordingly, the receiving device 101, etc. are arranged to be controlled by the control unit 110. Further, the positioning apparatus 100 has a positioning unit 111. The positioning unit 111 performs a search of or locates the eight SPS satellites 10a to 10h shown in FIG. 1 or the like via the receiving unit 101a.

Further, the positioning unit 111 decodes satellite data from, for example, the four SPS satellites 10aa to 10dd chosen for positioning based on the DOP values, in a process which will be described later, from among all the SPS satellites 10a . . . , acquires navigation messages, and performs positioning calculation based on pseudo-range information to acquire position information of latitude, longitude, and altitude.

In other words, the positioning unit 111 acquires position information by obtaining coordinates of an observation point and converting them into the coordinate system of latitude, longitude, and altitude. Accordingly, the positioning unit 111 is an example of a positioning device to acquire positioning information using SPS satellites 10a . . . selected based on satellite selection indicator information such as DOP values. Then, the positioning result data of the positioning unit 111 are stored as positioning result data 135 in a second storage unit as shown in FIG. 3.

As shown in FIG. 3, the positioning apparatus 100 has a first storage unit 120 and the second storage unit 130 respectively connected to the control unit 110. SPS satellite data 131 are stored in the second storage unit 130. The SPS satellite data 131 are satellite location data of the SPS satellites 10a to 10h shown in FIG. 1 acquired based on the navigation message acquired by the positioning unit 111 or the like. Accordingly, the SPS satellite data 131 are an example of satellite location information.

Further, a DOP value calculation program 121 is stored in the first storage unit 120 in FIG. 3. The DOP value is an indicator expressing the relative location between the SPS satellites as shown in FIGS. 9A and 9B. The smaller the DOP value, the higher the positioning precision can be realized. Specifically, at the time of positioning, when there is an error in the pseudo range from the SPS satellite with a given error value per set unit of distance, the DOP value indicates by what number the error per unit is multiplied in the positioning result. Therefore, when the DOP value is small, the positioning precision is good, and, when the DOP value is large, the positioning precision is bad.

The DOP value calculation program 121 selects a number of, for example four, SPS satellites 10aa to 10dd for positioning based on the SPS satellite data 131 of the second storage unit 130. Accordingly, the SPS satellites 10aa . . . for positioning are examples of the plural SPS used for positioning, the DOP values is an example of the satellite selection indicator information, and the DOP value calculation program 121 is an example of a satellite selection indicator information generating device.

Specifically, for example, the DOP value calculation program 121 selects the four SPS satellites 10aa to 10dd for positioning as satellites capable of positioning precisely from among the acquired eight SPS satellites 10a to 10h shown in FIG. 1, based on the DOP values. Further, DOP includes PDOP (Position DOP), VDOP (Vertical DOP), HDOP (Horizontal DOP), etc. and any of them can be used in the invention, however, in the present embodiment, the DOP value is calculated using PDOP, which represents position precision best. Further, still referring to FIG. 3, DOP value calculation result data 132 are stored in the second storage unit 130. DOP value calculation result data 132 include the DOP values calculated by the DOP value calculation program 121 and data of the SPS satellites 10aa . . . , for positioning. Further, a SPS satellite positioning mode evaluation program 122 is stored in the first storage unit 120.

In other words, the SPS satellite positioning mode determination program 122 acquires electric wave data of the eight SPS satellites 10a to 10h, for example, from the SPS satellite data 131 of the second storage unit 130, and acquires electric wave reception environment information from the respective SPS satellites 10a . . . Specifically, the reception environment information is expressed as mode information, outdoor mode or indoor mode, distinguished according to signal intensity from the eight SPS satellites 10a . . . . In other words, when the signal intensity from the respective SPS satellites 10a . . . is strong, the information is in the outdoor mode, and contrary, when the signal intensity is weak, the information is in the indoor mode.

The outdoor mode is a mode in which the positioning apparatus 100 is located outdoors, for example, and signals from the SPS satellites 10a . . . are received in a good condition. In this mode, since signals can be received in a good condition and noise level can be suppressed to a low level only when the signal intensity from the SPS satellites 10a . . . is strong, the pseudo range is obtained and positioning is performed.

On the other hand, the indoor mode is a mode in which the positioning apparatus 100 is located indoors, for example, and signals from the SPS satellites 10a . . . are weak and can not be received in a good condition. In this mode, even when the signal intensity is generally weak, pseudo range is obtained and positioning is performed.

In other words, the indoor mode is a mode provided to find signals from the SPS satellites 10a . . . and to obtain a pseudo range even when positioning becomes difficult because the positioning can be performed only in the outdoor mode and the positioning apparatus 100 is located indoors.

Still referring to FIG. 3, as described above, the SPS satellite positioning mode determination program 122 acquires signal data of the respective SPS satellites 10a . . . from the SPS satellite data 131 of the second storage unit 130, analyzes signal intensity, and determines whether each of the SPS satellites 10a, etc. is the outdoor mode or indoor mode according to the electric field intensity.

In the second storage unit 130, SPS satellite positioning mode determination result data 133 as outdoor mode information or indoor mode information with respect to each of the SPS satellites 10a . . . determined in the SPS satellite positioning mode determination program 122 of the first storage unit 120 is stored as integral numbers or the like, for example.

Further, as shown in FIG. 3, a DOP threshold value calculation program 123 is stored in the first storage unit 120. In other words, DOP threshold values are calculated based on the outdoor or indoor mode information with respect to each of the SPS satellites 10a . . . , which is the SPS satellite positioning mode determination result data 133 of the second storage unit 130.

Specifically, the DOP threshold value calculation program 123 refers to DOP threshold value calculation table data 124 stored in the first storage unit 120 to calculate the DOP threshold values.

Figure 4:
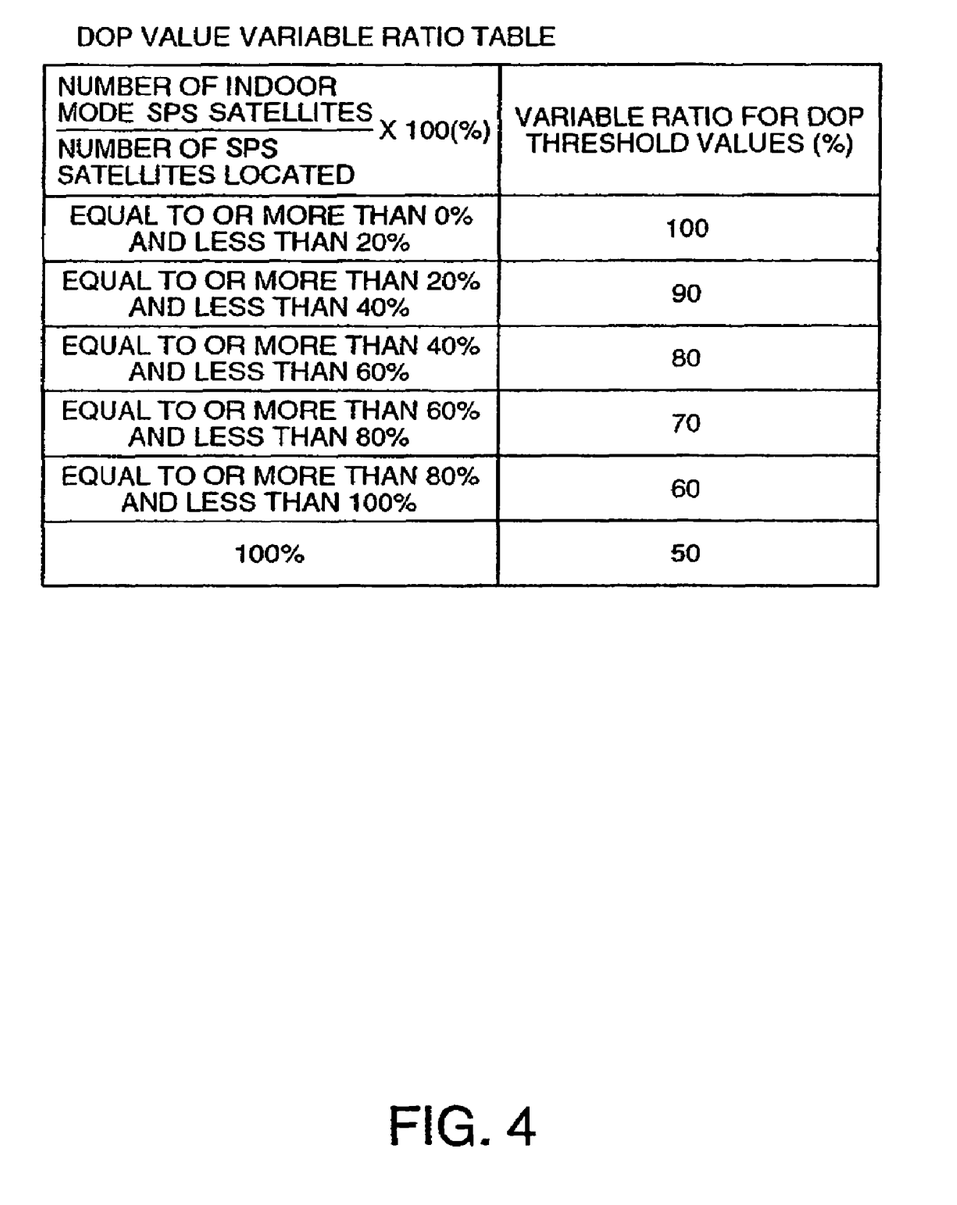
FIG. 4 is a view of a schematic DOP value variable ratio— DOP threshold value calculation table example.

FIG. 4 is a view of an example of a table showing DOP variable ratio values determined based on DOP threshold values 124. In the left column in FIG. 4, "number of indoor mode SPS satellites/number of located SPS satellites×100 (%)" is shown. In other words, the ratios of the number of the SPS satellites 10a . . . in the indoor mode to the number of the SPS satellites 10a . . . acquired by the positioning unit 111 in FIG. 3 are segmented in six stages.

For example, when the total number of the acquired SPS satellites 10a . . . is eight, and the number of those SPS satellites 10a . . . which are in the indoor mode is zero, i.e., all of them are in the outdoor mode, the value becomes 0%.

The right column in FIG. 4 shows variable ratios (%) of DOP threshold values and segmented in six stages as in the left column. For example, when the ratio of number of indoor mode SPS satellites in the left column is 0%, the variable ratio (%) of DOP threshold value in the right column becomes 100%. In this case, all of the acquired SPS satellites 10a . . . are in the outdoor mode, and is indicated, because the signal intensity that the positioning apparatus 100 receives from the SPS satellites 10a . . . is strong. Thus, even when the DOP value is large, the positioning precision is improved.

On the other hand, when the ratio of the number of indoor mode SPS satellites in the left column is 100%, the acquired SPS satellites 10a . . . are in the indoor mode and the signal intensity that the positioning apparatus receives from the SPS satellites 10a . . . is extremely weak. Accordingly, the DOP ratio threshold value (%) in the right column is set to 50%. In this case, all of the above described values are half of those in the case of the outdoor mode. Accordingly, the positioning precision can be improved when the DOP value is small.

The DOP threshold value calculation program 123 calculates using such a DOP threshold value calculation data table 124.

Specifically, the DOP threshold values are calculated based on the DOP ratio threshold values (%) in the right column in FIG. 4, for example, 100% or 50% and the initial value. Specifically, the DOP threshold value is calculated by taking "initial value×DOP ratio threshold value (%)." The initial value is a numeric value which allows DOP threshold values to correspond to DOP values, "10" for example.

As described above, when the ratio of the number of indoor mode SPS satellites is 0% and thus the variable ratio (%) of DOP threshold value is 100%, 10 (initial value)×100(%)=10, and the DOP threshold value becomes "10." Further, when the ratio of the number of indoor mode SPS satellites is 100% and the variable ratio (%) of DOP threshold value is 50%, 10 (initial value)×50(%)=5, and the DOP threshold value becomes "5." Thus, the DOP threshold value becomes smaller as the DOP threshold ratio (%) value becomes smaller, and the smaller DOP threshold value shows that the signal intensity from the SPS satellites 10a . . . received by the positioning apparatus 100 becomes weaker.

Conversely, the larger DOP threshold value shows that the intensity of signals from the SPS satellites 10a . . . received by the positioning apparatus 100 is strong. Therefore, the DOP threshold values are an example of information calculated based on the ratio of the outdoor mode or indoor mode SPS satellites 10a. . . .

In the method described above, by setting the DOP threshold values based on the ratio of the outdoor mode or indoor mode for each of the SPS satellites 10a . . . , the reception environment for electric waves of all the SPS satellites 10a . . . located by the positioning apparatus 100 can be shown in a simple and precise manner. Thus, the DOP threshold values calculated by the DOP threshold value calculation program 123 are stored in DOP threshold value calculation result data 134 of the second storage unit 130 shown in FIG. 3.

The thus calculated DOP threshold values are values "from 10 to 5" as shown in FIG. 4, and these DOP threshold values are numeric values corresponding to DOP values. In other words, the DOP values also have values "from 10 to 5." Therefore, the DOP threshold value calculation program 123 shown in FIG. 3 is an example of a reception environment indicator information generating device to generate reception environment indicator information (DOP threshold values or the like) that can be compared against DOP values with respect to positioning precision based on the mode information of signal intensity of electric waves from the SPS satellites 10a. . . .

Further, as shown in FIG. 3, the second storage unit 120 has a positioning result output/no output evaluation program 125. The positioning result output/no output evaluation program 125 compares a DOP value from the DOP value calculation result data 132 with a DOP threshold value as the DOP threshold value calculation result data 134 and determines whether the positioning result shall be output or not based on the DOP value. Specifically, the positioning result output/no output evaluation program 125 is arranged to display positioning result data 135 on the display device 102 in the case where the DOP value is equal to or less than the DOP threshold value, for example. For example, when the DOP value is "8," and all of the SPS satellites 10a . . . acquired by the positioning unit 111 are in the outdoor mode and the reception environment is good, and the DOP threshold value as the reception environment threshold value is "10," the positioning result output/no output evaluation program 125 determines that the positioning result data 125 can be displayed because the DOP value "8" is less than the DOP threshold value "10."

In other words, in the case where the signal intensity from the SPS satellites 10a . . . is strong and all of them are in the outdoor mode, it is highly possible that positioning can be performed with precision even when the DOP value is high. Accordingly, the DOP threshold value is set to as high as "10" in the table of FIG. 4 or the like, and, when the DOP value is equal to or less than "10," the positioning result data 135 are displayed.

On the other hand, in the case where the signal intensity from the SPS satellites 10a . . . is weak and all of them are in the indoor mode, it is scarcely possible that positioning can be performed with precision when the DOP value is high. Accordingly, the DOP threshold value is set to as low as "5" from FIG. 4 or the like, and, when the DOP value is equal to or less than "5," i.e., only when the DOP value is good, the positioning result data 135 are displayed.

Further, the numeric value of the DOP threshold value is larger as the signal intensity is stronger, and smaller as the signal intensity is weaker from FIG. 4 or the like. For example, the numeric value is "10, 9, 8, 7, 6, 5." Thus, as the signal intensity of the entire eight SPS satellites 10a . . . acquired by the positioning apparatus 100 becomes weaker, the DOP value required for the positioning becomes lower in stages.

In other words, the positioning result output or not program 125 is an example of a positioning information evaluation device to determine whether the positioning result data 135 are to be outputted to the display device 102 or not, based on the DOP values and DOP threshold values.

The positioning apparatus 100 according to the present invention is constructed as above, and an operation example etc. thereof will be described as below.

Regarding Main Operation Example of Positioning Apparatus 100

Figure 5:
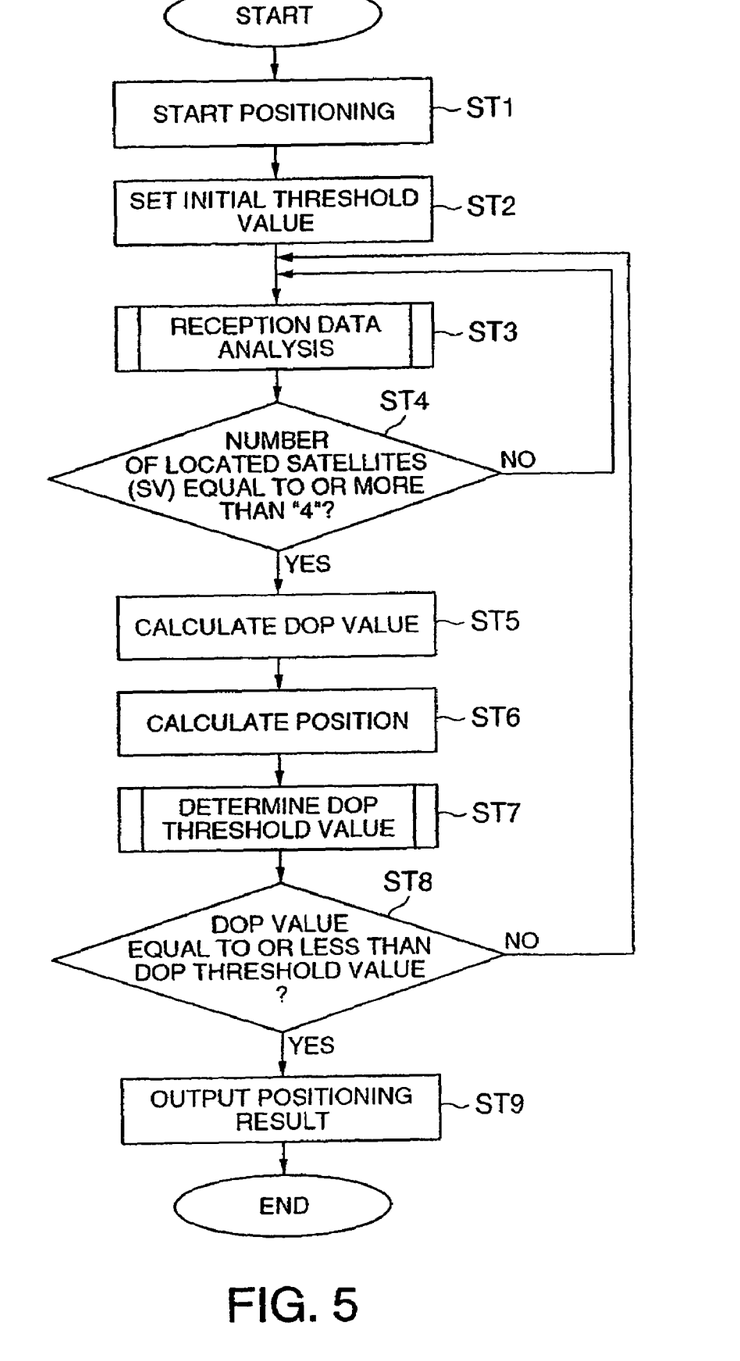
FIG. 5 is a view of a schematic flowchart showing a main operation example of the positioning apparatus according to the first embodiment.

FIG. 5 is a schematic flowchart showing a main operation example of the positioning apparatus 100 of the embodiment.

First, a user of the positioning apparatus 100 shown in FIG. 1 operates the operating device 102, and thereby, positioning is started (ST1).

Then, at ST2, the initial value when the DOP threshold value calculation program 123 of FIG. 3 performs a calculation based on the DOP threshold value calculation table data 124 is set. This initial value is a reference value for the DOP threshold value calculation program 123 in FIG. 3 to calculate a DOP threshold value that can be compared with a DOP value.

As to the initial value, a fixed value may be stored in the storage device 107 shown in FIG. 2 in advance, or the user may be enabled to set an arbitrary value. In this embodiment, an example in which an initial value for calculating a DOP threshold value comparable to a DOP value is set to "10" is described.

Figure 6:
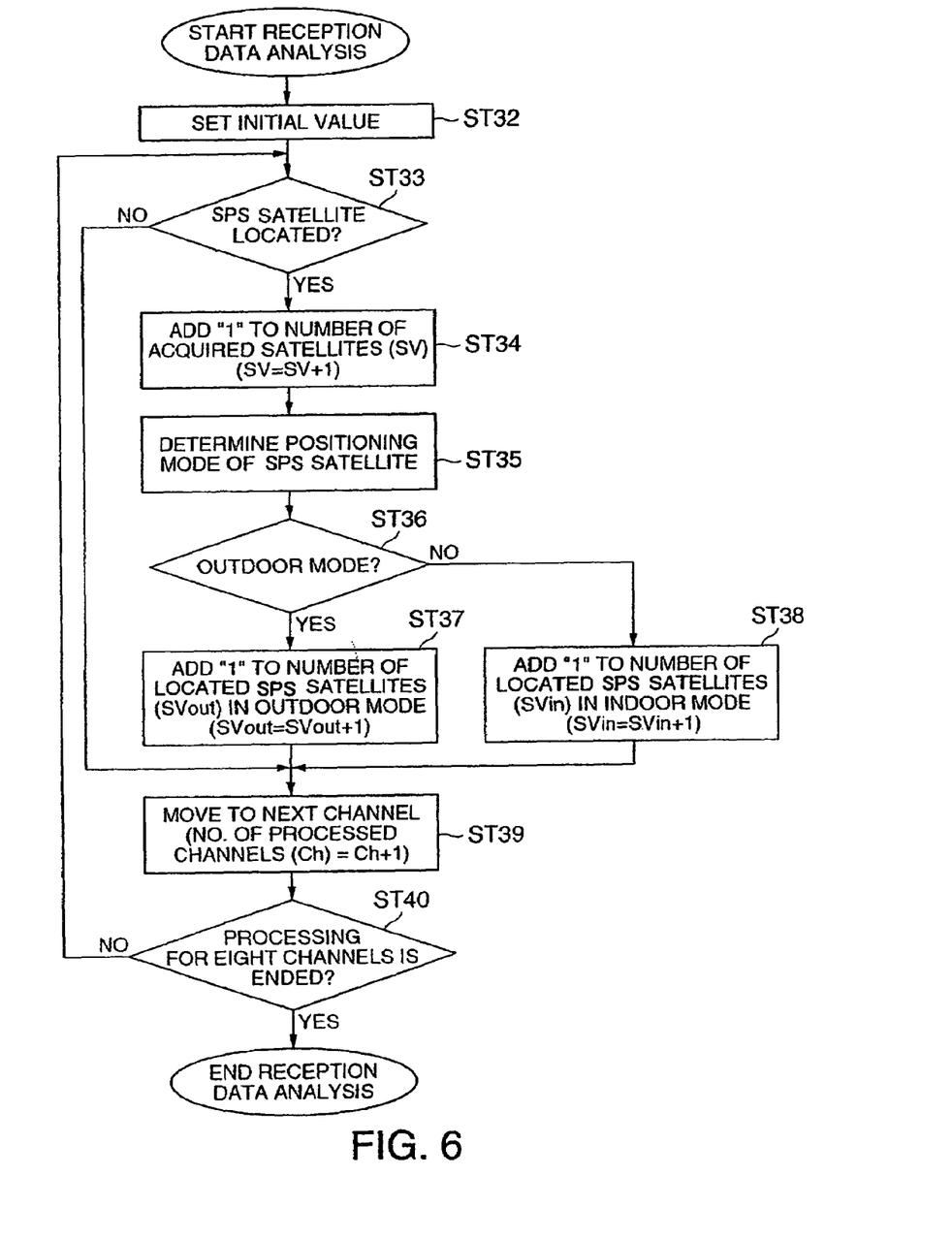
FIG. 6 is a view of a schematic flowchart showing an operation example of reception data analysis shown in FIG. 5.

Then, at ST3, reception data analysis is performed. FIG. 6 is a view of a schematic flowchart showing an operation example of the reception data analysis at ST3. As shown in FIG. 6, first, initial value setting is performed (ST32). In other words, data of previous reception data analysis or the like are reset, and the initial value is once set to "0," for example.

Then, whether satellites have been located or not is determined (ST33). In other words, the positioning unit 111 in FIG. 3 determines whether the SPS satellites 10a . . . in FIG. 1 have been located or not. In the embodiment, the positioning apparatus 100 has eight channels, and thereby, can track eight SPS satellites 10a . . . . Therefore, the positioning apparatus 100 performs the searching operation for the SPS satellites 10a . . . in the order from the first channel to the eighth channel.

First, the positioning apparatus 100 executes an acquisition operation of the SPS satellites 10a . . . with respect to the first channel. When the apparatus cannot locate the SPS satellites 10a in the first channel, the process moves to the next channel, i.e., the second channel and adds "1" to the processed channel counter (Ch) (ST39).

On the other hand, when the apparatus can locate the SPS satellite 10a, for example, in the first channel, it adds "1" to the number of acquired satellites (SV) (ST34).

Then, whether the SPS satellite 10a is in the indoor mode or outdoor mode is determined from the signal intensity of the electric wave from the acquired SPS satellite 10a (ST35). Specifically, the SPS satellite positioning mode determination program 122 of the first storage unit 120 shown in FIG. 3 determines the mode. Then, the result is stored in the second storage unit 130 as the SPS satellite positioning mode determination result data 133 shown in FIG. 3.

Then, the positioning mode of the SPS satellite 10a is determined (ST36). In other words, when the SPS satellite 10a is in the outdoor mode, as shown in ST37, "1" is added to the number of acquired satellites in the outdoor mode (SVout). On the other hand, when the SPS satellite 10a is in the indoor mode, as shown in ST38, "1" is added to the number of acquired satellites in the indoor mode (SVin).

Thus, the process is ended with respect to the first channel, and, as shown in ST39, moves to the next channel, i.e., the second channel and adds "1" to the processed channel counter (Ch).

Then, whether the number of processed channels is "8" or not, In other words, whether processing is ended with respect to all of the eight channels or not is determined (ST40), and the same operation is repeated from the first channel to the eighth channel until the processing is ended.

Figure 7A:
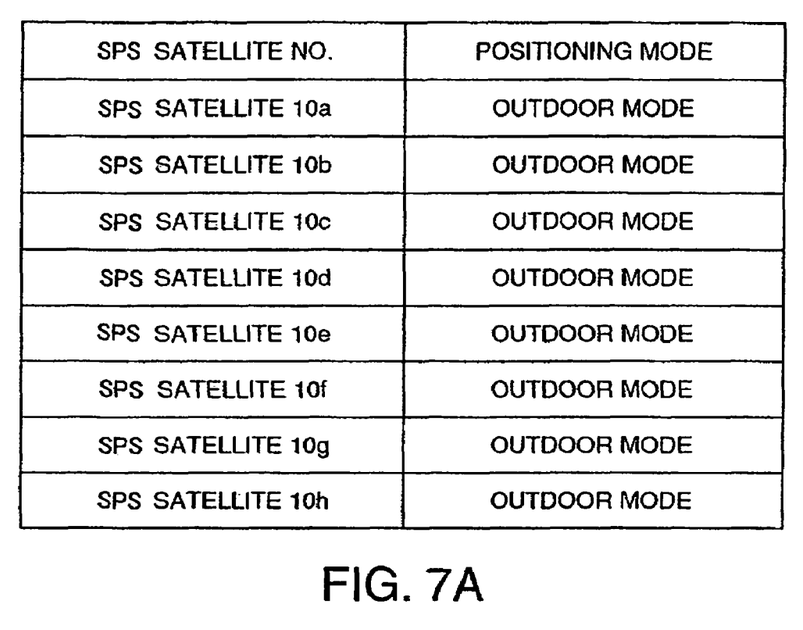
FIGS. 7A and 7B are views of tables showing analysis examples on which reception data analysis is performed.
Figure 7B:
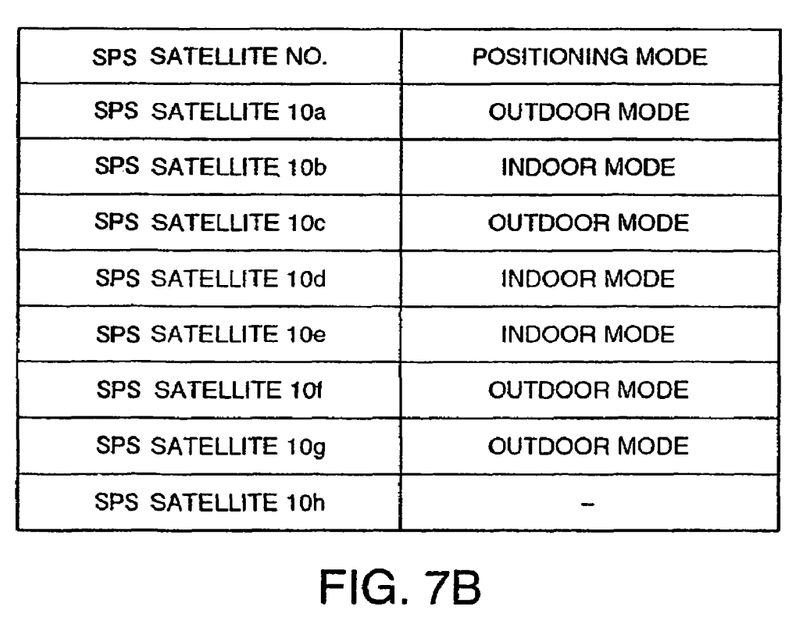

FIGS. 7A and 7B are tables showing analysis examples in which reception data analyses are thus performed. FIG. 7A shows the case where all of the SPS satellites 10*a* to 10*h* are in the outdoor mode.

FIG. 7B shows the case where the SPS satellites 10*a*, 10*c*, 10*f*, and 10*g* are in the outdoor mode, the SPS satellites 10*b*, 10*d*, and 10*e* are in the indoor mode, and the SPS satellite 10*h* can not be acquired. In other words, data as in FIGS. 7A and 7B are stored in the second storage unit 130 in FIG. 3 as the SPS satellite positioning mode determination result data 133.

As shown in FIG. 5, when the reception data analysis (ST3) is ended as described above, whether the number of located satellites (SV) is equal to or more than "4" or not is determined (ST4). In order to obtain latitude, longitude, and altitude as positioning information by single positioning using the SPS, searching of or locating at least four SPS satellites 10*a* . . . is required. However, since the positioning (two-dimensional positioning) can be performed by performing calculation on the assumption that one of the SPS satellites 10*a* . . . is located at the center of an ellipsoid even when only three of the SPS satellites 10*a* . . . can be located, it is sufficient that it be determined whether three or more SPS satellites 10*a* . . . can be located, unlike this embodiment.

In the present embodiment, when four or more are not located, it is determined that positioning is impossible, and performs reception data analysis by returning to ST 3. On the other hand, when the number of located satellites (SV) is four or more, the DOP value is calculated (ST5) (an example of satellite selection indicator information generating step). In other words, the DOP value expressing the condition of the SPS satellites 10*a* . . . located at ST3 is determined. Specifically, the DOP value calculation program 121 of the first storage unit 120 shown in FIG. 3 calculates the DOP value based on the SPS satellite data 131 of the second storage unit 130, and stores the calculation result as the DOP value calculation result data 132 in the second storage unit 130.

When the number of satellites (SV) acquired at ST3 is five or more, there are plural DOP values.

Then, the positioning apparatus 100 performs position calculation (ST6) (an example of positioning step). In other words, the control unit 110 in FIG. 3 selects the smallest DOP value from the DOP value calculation result data 132 in the second storage unit 130, and sets four SPS satellites 10*a* . . . corresponding to that DOP value as SPS satellites 10*aa*, 10*bb*, 10*cc*, and 10*dd* for positioning.

Then, the positioning unit 111 acquires the latitude, longitude, and altitude positioning information based on the navigation data of these four SPS satellites 10*a* . . . . The position calculation is performed based on the navigation data, and thereby, the coordinates of an observation point in WGS84 geographic coordinate system are calculated.

In the present embodiment, to make the display easier to understand for users, the coordinates are converted into a geographic coordinate system normally used in the observation point, for example, when the observation point is in Japan, they are converted into latitude, longitude, and altitude according to Japanese Geodetic Datum 2000.

Then, the DOP threshold value is determined (ST7) (an example of reception environment indicator information generating step). In other words, the DOP threshold value calculation program 123 shown in FIG. 3 determines the DOP threshold values based on the SPS satellite positioning mode determination result data 133 and the DOP threshold value calculation table (DOP value variable ratio table of FIG. 4) 124.

Figure 8:
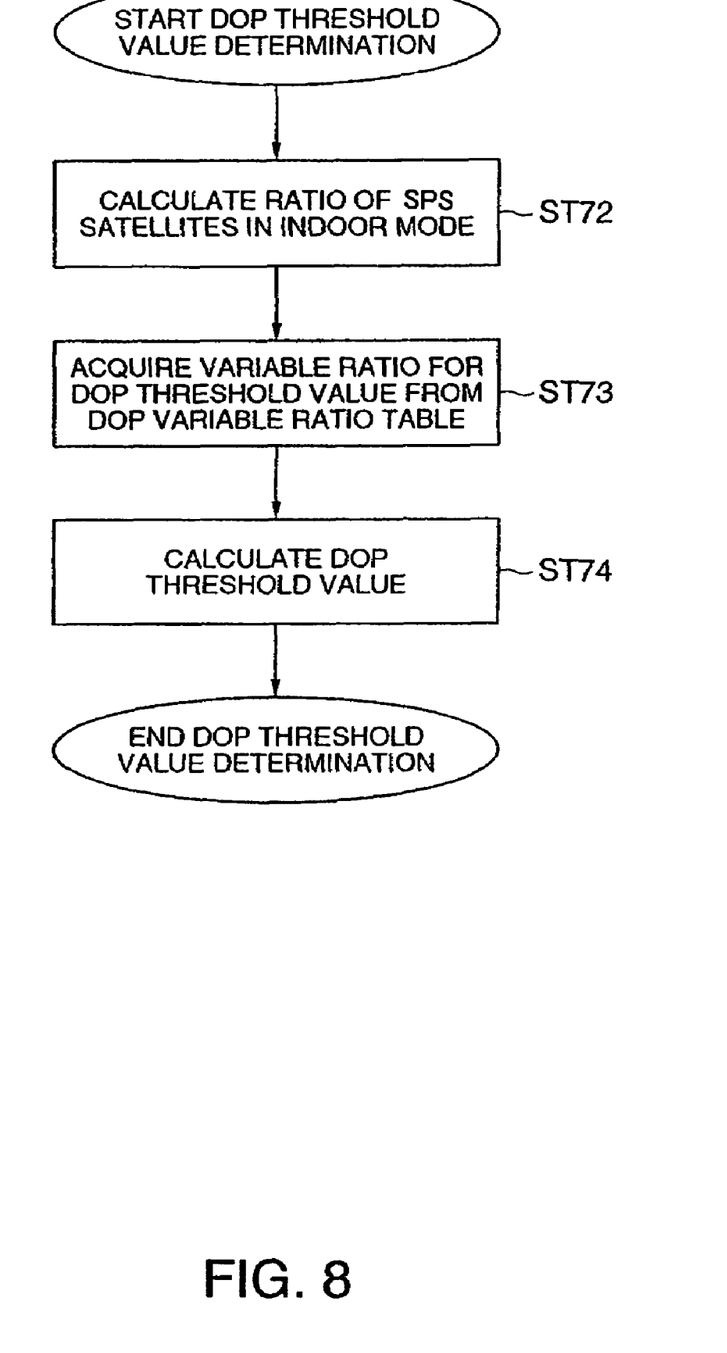
FIG. 8 is a view of a schematic flowchart showing an operation example of DOP threshold value determination.

FIG. 8 is a schematic flowchart showing an operation example of DOP threshold value determination. The operation example of DOP threshold value determination shown in FIG. 8 will be described based on the example in FIG. 7A or FIG. 7B.

First, the ratio of indoor mode is calculated at ST72 in FIG. 8 (ST72). In other words, in the case of FIG. 7A, since all of the acquired SPS satellites 10*a* . . . are in the outdoor mode, the ratio of indoor mode is calculated by 0/8×100 as 0% from the DOP value variable ratio table in FIG. 4.

On the other hand, in the case of FIG. 7B, because three of the acquired SPS satellites 10*a* . . . are in the indoor mode, the ratio of indoor mode is calculated by 3/7×100 as about 42.8% from the DOP value variable ratio table in FIG. 4.

Then, the DOP ratio threshold value is acquired from the DOP value variable ratio table in FIG. 4 (ST7). In other words, in the case of FIG. 7A, since the numeric value in the left column in FIG. 4 is "0%," the DOP ratio threshold value is "100%." Further, in the case of FIG. 7B, because the numeric value in the left column in FIG. 4 is "42.8%," the DOP ratio threshold value is "80%."

Then, the DOP threshold value is calculated (ST74). In other words, the DOP threshold value calculation program 123 in FIG. 3 calculates the DOP threshold value where "10" is the initial value set at ST2.

Specifically, in the case of FIG. 7A, from 10×100%=10, the DOP threshold value is "10." On the other hand, in the case of FIG. 7B, from 10×80%=8, the DOP threshold value is "8."

Thus, the DOP threshold value is calculated and the DOP threshold value determining step in FIG. 5 is ended.

Then, whether the DOP value calculated at ST5 is equal to or less than the DOP threshold value calculated at ST7 or not is determined (ST8). When the DOP value is equal to or less than the DOP threshold value, the positioning calculation result at ST6 is output, and, when the DOP value exceeds the DOP threshold value, the positioning calculation result at ST6 is not output (ST9) (an example of positioning information evaluation step and outputting step).

In other words, the positioning result output/no output evaluation program 125 of the first storage unit 120 shown in FIG. 3 determines whether the DOP value of the DOP value calculation result data 132 of the second storage unit 130 is equal to or less than the DOP threshold value of the DOP threshold value calculation result data 134 or not. Only when the DOP value is equal to or less than the DOP threshold value, the display positioning result data 135 of the second storage unit 130 are displayed on the display device 102 via the display unit 102*a*.

Specifically, in the case of FIG. 7A, when the DOP value is equal to or less than "10," the positioning result is output, and, in the case of FIG. 7B, only when the DOP value is equal to or less than "8," the positioning result is output.

Thus, according to the present embodiment, in comparison between FIG. 7A and FIG. 7B, the DOP value is required to be smaller in FIG. 7B. In other words, as shown in FIG. 7B, when the indoor mode satellites are included, there is a possibility that the electric wave signal intensity from the SPS satellites 10*a* . . . has become weak and the positioning precision has deteriorated.

Further, when positioning is performed with the large DOP value in spite of the fact that the signal intensity is weak, there is a possibility that the positioning precision has deteriorated. When the positioning result in the condition in which the positioning precision has deteriorated is displayed on the display device 102, the reliability of the positioning apparatus 100 is decreased. Accordingly, in the present embodiment, a positioning result that possibly deteriorates the positioning precision is determined not to be output to the display device 102, and thereby, the precision of the positioning apparatus 100 is prevented from becoming lower.

Further, as in FIG. 7A, in the case where the electric wave signal intensity from the SPS satellites 10a ... is strong, even when the DOP value is a value that is not output in FIG. 7B, there is a lower possibility that the positioning precision has deteriorated. Accordingly, in FIG. 7A, positioning results are output even when the DOP value is a value that is not output in FIG. 7B.

Thus, depending to the quality level of the reception environment for signals from the SPS satellites 10a ..., the positioning function evaluation reliability of the DOP value is varied, and only the positioning result with higher precision is displayed on the display device 102, and thereby, the reliability of the positioning apparatus 100 is improved.

Further, as in the present embodiment, when the SPS satellites 10aa ... actually used by the positioning unit 111 for positioning are included in the SPS satellites 10a ... as targets for the SPS satellite positioning mode determination program 122 shown in FIG. 3 to determine positioning modes (indoor mode or outdoor mode), the DOP threshold values are calculated from the SPS satellites 10aa ... actually used for positioning, and the reception environment for the electric wave signals from the SPS satellites 10aa ... for positioning can be grasped more accurately based on intensity of the signals.

Regarding Program and Computer Readable Recording Medium and the Like

Positioning programs and the like for allowing a computer to execute the satellite selection indicator information generating step, the positioning step, outputting step, reception environment indicator information generating step, positioning information evaluation step, etc. in the above described operation example can be realized. Further, a computer readable recording medium in which such positioning program etc. are stored can also be realized.

A program storage medium used for installing these positioning programs or the like in a computer and enabling them to be executed by the computer can be realized not only by package media such as a flexible disk or a floppy disk, CD-ROM (Compact Disc Read Only Memory), CD-R (Compact Disc-Recordable), CD-RW (Compact Disc-Rewritable), DVD (Digital Versatile Disc), for example, but also by a semiconductor memory, magnetic disk, magneto-optical disk, or the like in which programs are temporarily or permanently stored.

The invention is not limited to the above described respective embodiments. Furthermore, the above described respective embodiments may be combined with one another.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-143970. The entire disclosure of Japanese Patent Application No. 2004-143970 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A positioning apparatus comprising:
   a satellite selection indicator information generating device being configured to generate satellite selection indicator information based on satellite location information of an SPS (Satellite Positioning System) to select a plurality of SPS satellites used to position;
   a positioning device being configured to acquire positioning information by using said plurality of SPS satellites selected based on said satellite selection indicator information;
   an outputting device being configured to output said positioning information;
   a reception environment indicator information generating device being configured to generate reception environment indicator information of said SPS based on information of reception environment in receiving electric waves from said SPS, said reception environment indicator information being compared with said satellite selection indicator information with respect to positioning precision; and
   a positioning information evaluation device being configured to determine whether said positioning information is output to said outputting device or not, based on said satellite selection indicator information and said reception environment indicator information,
   said information of said reception environment being in an outdoor mode, if signal intensity of said electric waves from said SPS equals or exceeds a predetermined level,
   said information of said reception environment being in an indoor mode, if said signal intensity is less than said predetermined level, each of said plurality of SPS satellites being determined to have said information of said reception environment either in said outdoor mode or said indoor mode, said reception environment indicator information being based on a ratio of the number of said SPS satellites in said outdoor mode to the total number of said SPS satellites which are acquired, or the number of said SPS satellites in said indoor mode to the total number of said SPS satellites which are acquired.

2. The positioning apparatus according to claim 1, wherein said SPS that generate reception environment indicator information by said reception environment indicator information generating device are the plurality of SPS satellites used to position.

3. The positioning apparatus according to claim 2, wherein said reception environment indicator information is reception environment threshold value information, and said satellite selection indicator information is DOP value information representing the location status of said SPS.

4. The positioning apparatus according to claim 1, wherein said reception environment indicator information is reception environment threshold value information, and said satellite selection indicator information is DOP value information representing the location status of said SPS.

5. The positioning apparatus according to claim 1, wherein said selection indicator information generating device is a DOP value calculation program configured to select said SPS.

6. The positioning apparatus according to claim 5, wherein said DOP value calculation program is configured to select four SPS.

7. The positioning apparatus according to claim 6, wherein said reception environment indicator information generating device is a DOP threshold value calculation program.

8. The positioning apparatus according to claim 1, wherein said reception environment indicator information generating device is a DOP threshold value calculation program.

9. A positioning method comprising:
generating satellite selection indicator information by a satellite selection indicator information generating device of a positioning apparatus based on satellite location information of an SPS to select a plurality of SPS satellites used to position;
acquiring positioning information from said plurality of SPS satellites selected based on said satellite selection indicator information by a positioning device of said positioning apparatus;
outputting said positioning information by an outputting device of said positioning apparatus;
generating reception environment indicator information based on information of reception environment in receiving electric waves from said SPS, said reception environment indicator information being compare with said satellite selection indicator information with respect to positioning precision; and
determining whether to output said positioning information to said outputting device or not, based on said satellite selection indicator information and said reception environment indicator information by a positioning information evaluation device of said positioning apparatus,
said information of reception environment being in an outdoor mode, if signal intensity of said electric waves from said SPS equals or exceeds a predetermined level,
said information of said reception environment being in an indoor mode, if said signal intensity is less than said predetermined level,
each of said plurality of SPS satellites being determined to have said information of said reception environment in said outdoor mode or said indoor mode,
said reception environment indicator information being based on a ratio of the number of said SPS satellites in said outdoor mode to the total number of said SPS satellites which are acquired, or the number of said SPS satellites in said indoor mode to the total number of said SPS satellites which are acquired.

10. A positioning program being adapted to run on a computer comprising:
computer code to generate satellite selection indicator information based on satellite location information of an SPS to select a plurality of SPS satellites to be used to position by a satellite selection indicator information generating device of a positioning apparatus;
computer code to acquire positioning information using said plurality of SPS satellites selected based on said satellite selection indicator information by a positioning device of said positioning apparatus;
computer code to output said positioning information by an outputting device of said positioning apparatus;
computer code to generate reception environment indicator information of said SPS based on information of reception environment in receiving electric waves from said SPS, said reception environment indicator information being compared with said satellite selection indicator information with respect to positioning precision; and
computer code to determine whether to output said positioning information to said outputting device or not, based on said satellite selection indicator information and said reception environment indicator information,
said information of said reception environment being in an outdoor mode, if signal intensity of said electric waves from said SPS equals or exceeds a predetermined level,
said information of reception environment being in an indoor mode, if said signal intensity is less than said predetermined level,
each of said plurality of SPS satellites being determined to have said information of reception environment either in said outdoor mode or said indoor mode,
said reception environment indicator information being based on a ratio of the number of said SPS satellites in said outdoor mode to total number of said SPS satellites which are acquired, or the number of said SPS satellites in said indoor mode to the total number of said SPS satellites which are acquired.

11. A computer-readable recording medium for recording a positioning program for allowing a computer to execute:
computer code to generate satellite selection indicator information based on satellite location information of an SPS to select a plurality of SPS satellites to be used to position by a satellite selection indicator information generating device of a positioning apparatus;
computer code to acquire positioning information using said plurality of SPS satellites selected based on said satellite selection indicator information by a positioning device of said positioning apparatus;
computer code to output said positioning information by an outputting device of said positioning apparatus,
computer code to generate reception environment indicator information of said SPS based on information of reception environment in receiving electric waves from said SPS, said reception environment indicator information being compared with said satellite selection indicator information with respect to positioning precision; and computer code to determine whether to output said positioning information to said outputting device or not, based on said satellite selection indicator information and said reception environment indicator information by a positioning information evaluation device of said positioning apparatus, said information of said reception environment being in an outdoor mode, if signal intensity from said SPS equals or exceeds a predetermined level, said information of said reception environment being in an indoor mode, if signal intensity from said SPS is less than said predetermined level, each of said plurality of SPS satellites being determined to have said information of said reception environment either in said outdoor mode or said indoor mode, said reception environment indicator information being based on a ratio of the number of said SPS satellites in said outdoor mode to the total number of said SPS satellites which are acquired, or the number of said SPS satellites in said indoor mode to the total number of said SPS satellites which are acquired.

* * * * *